United States Patent [19]

Hopkins et al.

[11] Patent Number: 5,184,960
[45] Date of Patent: Feb. 9, 1993

[54] TRAILER LIGHT CONNECTION SYSTEM

[75] Inventors: Evan L. Hopkins; Wesley E. Bowden; Evan L. Hopkins, all of Emporia, Kans.

[73] Assignee: Hopkins Manufacturing Corporation, Emporia, Kans.

[21] Appl. No.: 863,860

[22] Filed: Apr. 6, 1992

[51] Int. Cl.⁵ .............................................. H01R 33/00
[52] U.S. Cl. ...................................... 439/35; 280/422
[58] Field of Search ................................... 439/34–36; 191/11; 280/422

[56] References Cited

U.S. PATENT DOCUMENTS

| 4,057,310 | 11/1977 | Young | 439/35 |
| 4,842,524 | 6/1989 | Hopkins et al. | |
| 4,846,697 | 7/1989 | Rodgers | 439/35 |

OTHER PUBLICATIONS

Draw-Tite ordering form for "T-One" connectors.

Primary Examiner—Eugene F. Desmond
Attorney, Agent, or Firm—Calfee, Halter & Griswold

[57] ABSTRACT

A trailer light connection system includes a T-shaped connector having three terminals including a modularized tap plug as the third terminal for direct or indirect connection to the trailer lighting system. One of the conductors leading to the tap plug can be selectively disconnected from the first and second terminals and then reconnected to a ground receptacle on the vehicle to ground the trailer to the towing vehicle when the trailer does not have a back-up light system. By standardizing the system components and modularizing the tap plug connections, the trailer light system of the present invention reduces the number of stock keeping units required while simplifying system installation.

8 Claims, 2 Drawing Sheets

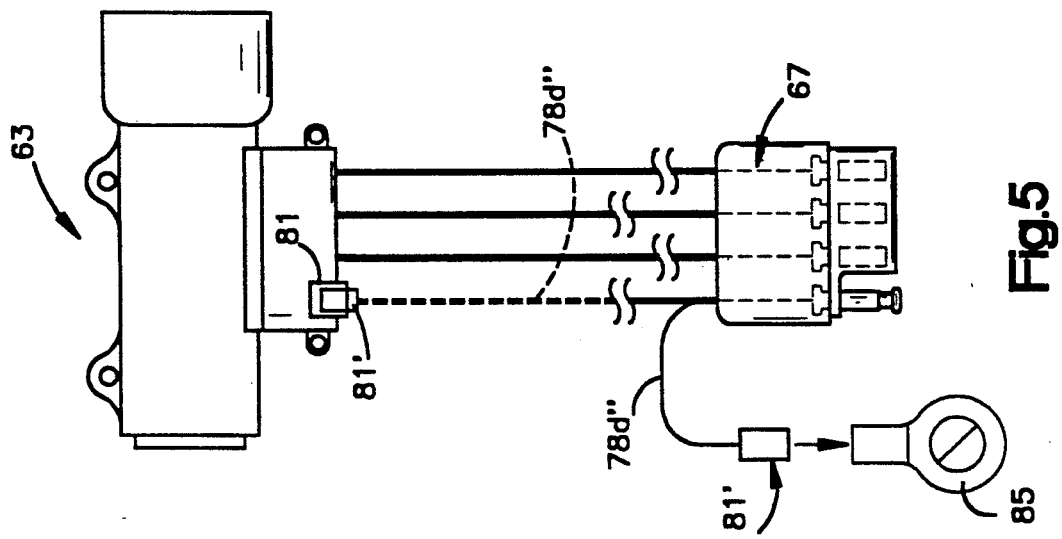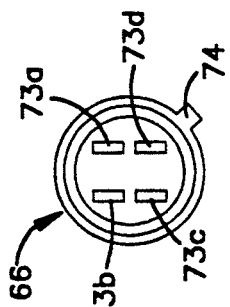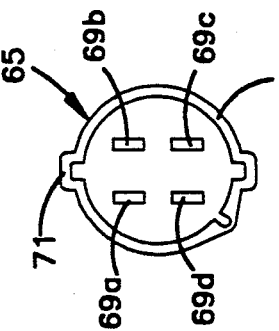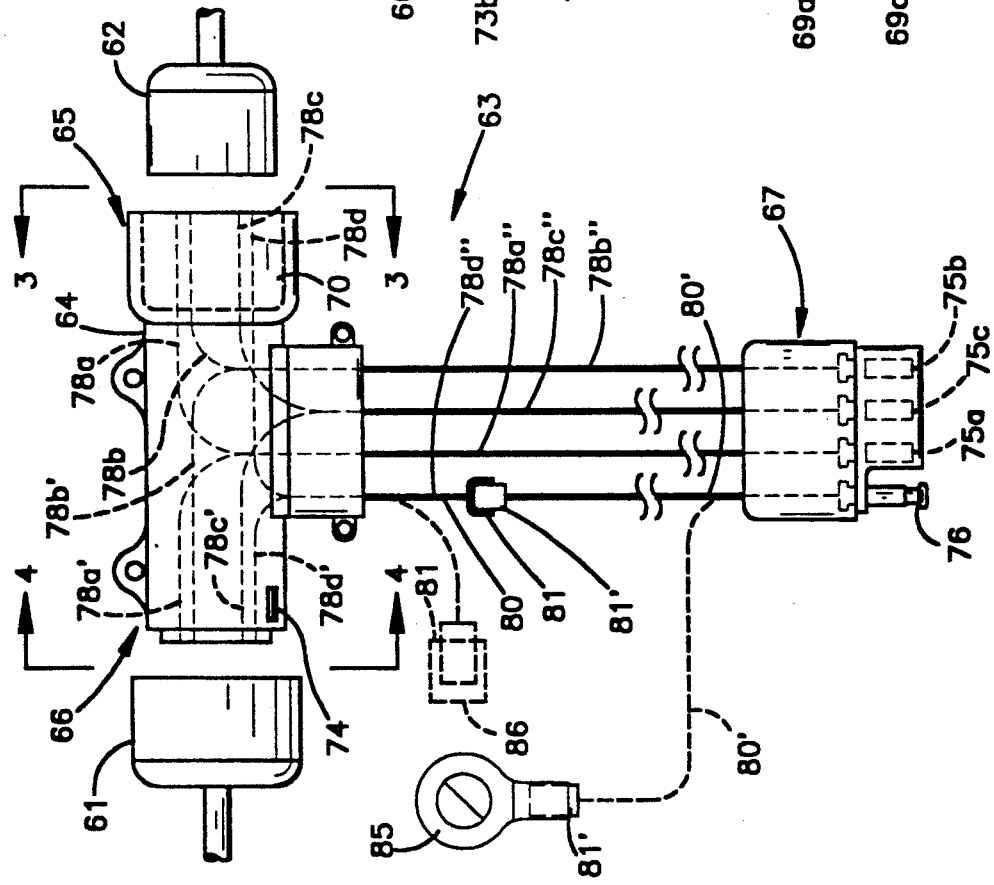

TRAILER LIGHT CONNECTION SYSTEM

FIELD OF THE INVENTION

The present invention relates generally to a trailer light connection system, and more particularly relates to connector components thereof which provide easy and reliable installation.

BACKGROUND OF THE INVENTION

Trailer light connector systems are well known in the art. The systems differ slightly depending upon the model and type of towing vehicle.

In a pick-up truck for example, the factory installs, as original equipment, electrical wiring for the cab and electrical wiring for the chassis. The cab wiring and chassis wiring are electrically interconnected by a plug having male terminals and a plug having female terminals cooperatively coupled as a plug set to complete the electrical circuit therebetween.

A T-shaped connector may selectively be interposed between the plugs of the plug set to retain the overall vehicle circuit while providing a tap for electrical power to a trailer. T-shaped connectors of this type have been commercially available from the assignee of the present invention and from its predecessor in interest, Olathe Automotive Wiring Company. The prior art T-shaped connector included a plurality of individual insulated wires extending outwardly from the T-shaped connector body for the trailer tap. These insulated tap wires from the T-shaped connector body were then hard wired to the vehicle end of a trailer wiring system. This hard wiring of the trailer tap to the trailer wiring system was inconvenient and time consuming and required care and experience in matching the tap wires of the T-shaped connector to like wires in the trailer wiring system. In addition, at times, special tools, such as a soldering gun, were required to complete the hard wiring process.

Another type of trailer light connection system utilizing a different type of T-shaped connector is shown in Hopkins et al., U.S. Pat. No. 4,842,524. The T-shaped connector has a body with three terminals. The first terminal is adapted for connection to a male vehicle wiring plug, the second terminal is adapted for connection to a female vehicle wiring plug to complete the vehicle electrical circuit, and the third terminal (constituting a tap plug) provides a source of electrical power for the trailer. A wiring harness having a first harness plug is removably coupled to the tap plug at one end and is coupled to the trailer light system at its other end to complete the electrical connection between the vehicle and the trailer.

The T-shaped connectors described in Hopkins U.S. Pat. No. 4,842,524 contribute important advantages to a connection system using modular components. The modular system facilitates connecting the trailer light electrical system with the towing vehicle electrical system and reduces the number of stockkeeping units needed. However, the T-shaped connectors shown in the patent lack a certain amount of flexibility in being able to provide a standarized tap plug which can be used with trailers having backup lights and with trailers which do not. More particularly, a tap plug having four terminals is typically used to provide power from a towing vehicle to a trailer with backup lights. The four terminals provide right and left turn signal functions, brake light functions and back-up light functions, respectively.

However, if the trailer does not have backup lights, only three of the terminals are necessary, and consequently, the extra conductor leading from the T-shaped connector for the backup lights on the trailer is unused. In this case, the unused conductor is typically cut, and the cut portion leading from the tap plug is stripped and connected to a ground on the towing vehicle to provide an electrical ground between the trailer and the towing vehicle. This hard wiring, however, can be inconvenient and time consuming to install, and does not always provide a reliable electrical connection.

SUMMARY OF THE INVENTION

The present invention provides a new and useful trailer light connection system that may be quickly and reliably installed without special tools. The trailer light connection system includes a T-shaped connector having a body with three terminals, wherein the first terminal is designed to be connected to a male vehicle wiring plug and a second terminal is adapted to be connected to a female vehicle wiring plug to complete the vehicle electrical circuit. A third terminal constituting a tap plug is connected to the body by a plurality of insulated conductors to provide a source of electrical power from the vehicle to the trailer. One of the conductors can be disconnected from the T-shaped connector and connected to a grounded receptacle on the vehicle to provide a grounded connection between the trailer and the towing vehicle. A wiring harness having a first harness plug can be removably coupled to the tap plug on the T-shaped connector on one end and to the trailer wiring system at the other end to complete the electrical connection between the vehicle and the trailer. Alternatively, the tap plug can be coupled directly to the trailer wiring system if the insulated conductors are long enough and the respective plugs are compatible.

Three of the insulated conductors leading from the body of the T-shaped connector to the tap plug provide power for the right and left turn signals and the brake lights, respectively. A fourth insulated conductor from the T-shaped connector includes a relatively short first conductor portion with a female receptacle which can be removably connected to a male plug on a relatively longer second conductor portion leading to the tap plug to provide power for the back-up lights on the trailer. In an alternative second embodiment, the T-shape connector body may have a female receptacle selectively to receive a male plug on the vehicle end of the fourth insulated conductor.

If the trailer does not include back-up lights, the male plug on the second portion of the fourth conductor can be unplugged from the female receptacle on the first portion. The male plug on the second portion of the fourth conductor is then removably connected to a grounded female receptacle on the vehicle to electrically ground the trailer to the vehicle. An insulated sheath can then be located over the female receptacle on the first portion of the fourth conductor to prevent damage to the female receptacle. In the alternative embodiment, if the trailer does not include back-up lights, the male plug at the vehicle end of the fourth conductor is disconnected from the T-shape connector body and is then connected to the grounded female receptacle on the vehicle to ground the trailer to the vehicle.

It is therefore an object of the present invention to provide a T-shaped connector in a trailer light connection set for towing vehicles having a plug-in tap connection.

It is another object of the present invention to provide a standardized T-shaped connector which can be used both with trailers having back-up lights and with trailers without backup lights, and which can be interchanged therebetween.

These and other objects of the present invention will become more apparent from the following detailed description and the accompanying drawings which form a part of the specification.

BRIEF DESCRIPTION OF THE DRAWINGS

FIG. 2 is a plan view of the modular T-shaped connector of FIG. 1, with the wiring and electrical connections in the connector body being schematically illustrated, and the connection to a ground receptacle being shown in phantom;

FIG. 3 is an end view of one terminal on the T-shaped connector of FIG. 2, taken substantially along the plane described by the lines 3—3 of FIG. 2;

FIG. 4 is an end view of a second terminal on the T-shaped connector of FIG. 2, taken substantially along the plane described by the lines 4—4 in FIG. 2; and FIG. 5 is a plan view of a second embodiment of the modular T-shaped connector, with the wiring and electrical connections of the fourth conductor between the connector body and tap plug being shown in phantom, and the selective connection of the fourth conductor to a ground receptacle on the vehicle being shown in full lines.

DETAILED DESCRIPTION OF THE PREFERRED EMBODIMENT

Figure 1:
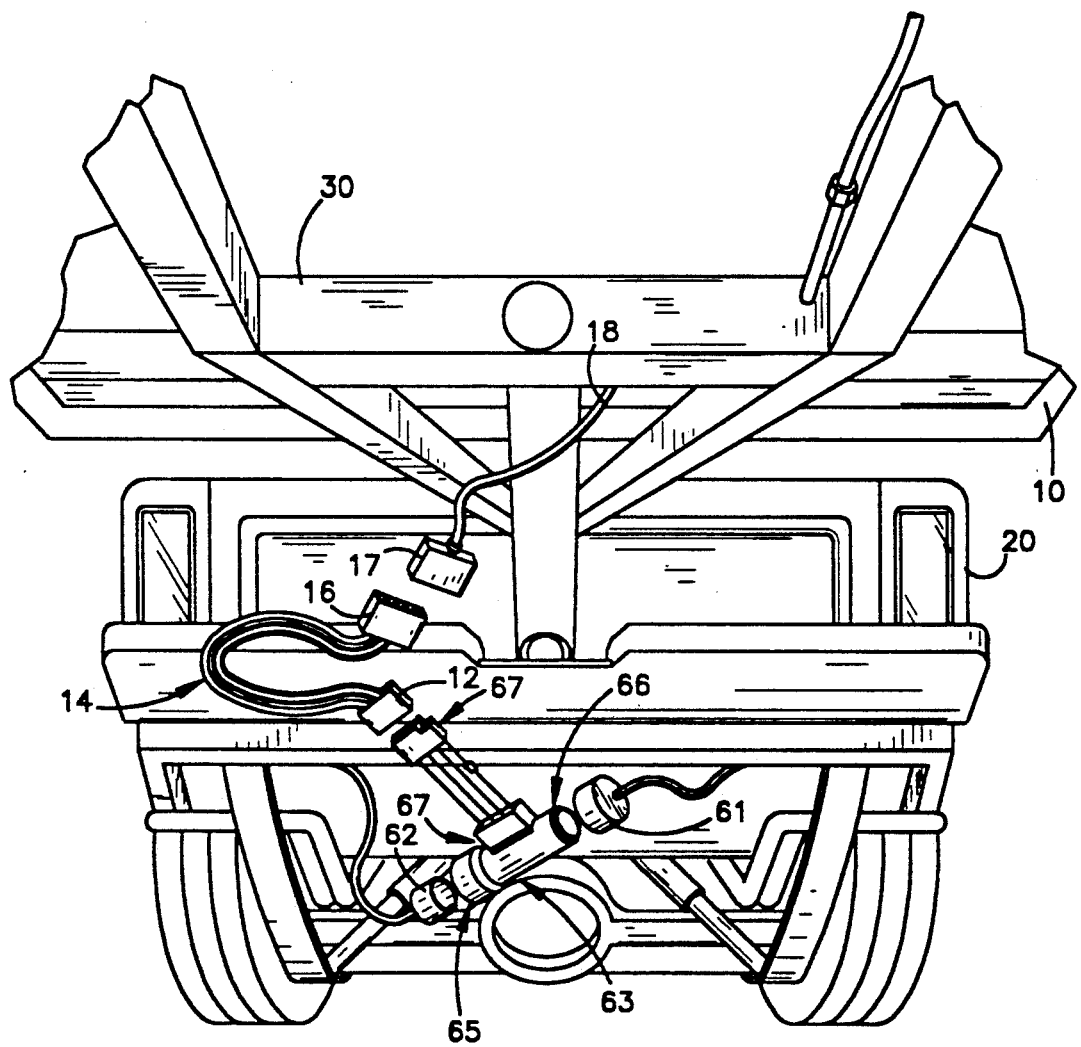
FIG. 1 is a bottom, partial perspective of the pick-up truck and trailer illustrating a trailer light connection system including a modular T-shaped connector of the present invention.

Referring to the drawings, and initially to FIG. 1, a trailer 10 is mechanically removably connected to a pick-up truck 20 by means of a trailer yoke 30. The electrical lighting system of the pick-up truck may be readily coupled to the electrical lighting system of the trailer by the trailer light connection system of the present invention.

To this end, the pick-up truck 20 includes as original equipment two separate electrical systems which are normally plugged together. The cab of the pick-up truck 20 will include an electrical system terminating in a plug 61. The truck body or chassis will have an electrical system terminating in a plug 62. Plugs 61 and 62 are normally held together by cooperating male and female terminals to couple the two electrical systems together into one overall electrical circuit for the vehicle. The specific form and size of the plugs 61 and 62 and of their respective male and female terminals may vary from model to model and/or from year to year.

To provide a trailer tap into the electrical circuit of the pick-up truck 20, a T-shaped connector, indicated generally at 63, is inserted between plugs 61 and 62. In FIGS. 2–4, a T-shaped connector for use with a Ford pick-up truck from model years 1980 to date is shown as illustrative of the concepts of the present invention. The T-shaped connector 63 includes a molded plastic body 64, preferably made of black PVC type material. The T-shaped molded body 64 has a first male terminal, indicated generally at 65, a second female terminal, indicated generally at 66 and a third trailer tap terminal, indicated generally at 67. The third trailer tap terminal 67 is connected to but spaced remotely from the body of the T-shaped connector.

The first male terminal 65 includes four spaced male terminal blades or prongs 69A–69D. These blades 69A–69D are mounted in and extend outwardly from the T-shaped body 64. The blades 69 are surrounded by a shroud or skirt 70 integrally formed with the molded body 64. The skirt 70 preferably has three circumferentially spaced outwardly extending key ways 71 formed therein. These key-ways cooperate with outwardly projecting ribs on plug 62 to properly orient and guide the plug 62 relative to first terminal means 65. The plug 62 has four female terminal receptacles which respectively receive the male blades 69 when the plug 62 is fully received in shroud 70.

The second terminal 66 includes four spaced female terminal receptacles 73A–73D. These female receptacles receive the male terminal blades on the plug 61. Plug 61 has a configuration corresponding to the first terminal 65 and has a skirt thereon which surrounds the second terminal 66 when the plugs are connected together. The plug 61 is properly oriented and guided by a rib 74 on body 64 cooperating with a key-way in the inner wall of the protective skirt on plug 61.

The third terminal 67, which provides the electrical tap for the trailer, is connected to the body 64 by insulated conductors 78A″–78D″. The third terminal of the T-shaped connector includes three female receptacle terminals 75A–75C and a male terminal 76.

As shown, electrical wires are embedded in the T-shaped connector body 64 electrically interconnecting the three terminal means. To this end, electrical wire 78A extends from male blade 69A in the first terminal and is connected together (e.g., spliced) with wire 78A′. Spliced wires 78A and 78A′ electrically interconnect male blade 69A in the first terminal with female receptacle 73A in the second terminal. First insulated conductor 78A″ is connected to and leads from spliced wires 78A and 78A′ to female receptacle terminal 75A on the tap plug 67. Wires 78A and 78A′ and first conductor 78A″ thereby have a common conductive contact to form a closed or continuous circuit between the male terminal blade 69A of the first terminal 65, the female receptacle contact 75A of the third terminal 67 and the female receptacle 73a of the second terminal 66.

The other functionally corresponding terminal blades and female terminal receptacles in the three terminals are similarly wired as illustrated. Specifically, spliced wires 78B and 78B′ interconnect male terminal 69B of the first terminal to female terminal receptacle 73B of the second terminal; and second insulated conductor 78B″ is connected to and leads from spliced wires 78B and 78B′ to female receptacle 75B of the third terminal. Spliced wires 78C and 78C′ interconnect male terminal 69c of the first terminal with female terminal receptacle 73C of the second terminal; and third insulated conductor 78C″ is connected to and leads from spliced wires 78C and 78C′ to the female receptacle 75C of the third terminal. Finally, spliced wires 78D and 78D′ interconnect male terminal 69D of the first terminal to female terminal receptacle 73D on the second terminal; and fourth insulated conductor 78D″ is connected to and leads from spliced wires 78D and 78D′ to male terminal 76 on the third terminal.

Fourth insulated conductor 78D" includes a first, relatively short conductor portion 80, and a second, relatively longer conductor portion 80'. The first and second conductor portions 80 and 80' of fourth insulated conductor 78D" are selectively electrically connected together. For example, first conductor portion 80 can have a female receptacle 81 on its free end, and the second conductor portion 80' can have a male plug 81, such as a round or flat blade, on its free end. The male plug 81' is designed to selectively mate with and be held within the female receptacle 81 to complete and electrically couple the first and second portions to form the fourth conductor 78D".

As will be apparent from the above, when female plug 62 is connected to the first terminal 65 and the male plug 61 is connected to the second terminal 66, the interposed T-shaped connector 63 maintains electrical circuit continuity for the overall vehicle between the chassis electrical system and the cab electrical system, while providing an activated third terminal as a tap for electrical power to the trailer lighting system. The cooperating ribs and keyways on the plugs and T-shaped connector ensure that terminals of like function are coupled to maintain the lighting integrity of the system.

The third terminal 67 is in the form of a tap plug which may readily be plugged into the cooperating plug 12 on the lead end of the trailer wiring harness 14. Plug 12 has three male terminals and a female receptacle terminal cooperatively interfitting in the proper electrical and mechanical orientation with the terminals on the third terminal 67 of the T-shaped connector 63. Thus, the trailer wiring harness can be easily and rapidly plugged into the T-shaped connector to provide a reliable electrical connection for the trailer. The other or rear end of the trailer wiring harness 14 has a plug 16 that cooperatively mates with a plug 17 on the trailer wiring system to complete the electrical lighting circuit between the pick-up truck 20 and the trailer 10. Alternatively, if the four conductors 78A"–78D" are long enough and plug 17 on the trailer wiring system is compatible with tap plug 67 on the T-shape connector, the wiring harness 14 may be dispensed with by directly coupling plug 17 on the trailer system to tap plug 67 on the T-shape connector.

The T-shaped connector shown in FIG. 2 is for a four wire trailer light electrical system having backup lights. As described previously, the wires 78A, 78A' and first conductor 78A" provide power for the tail and brake lights of the trailer. The wires 78B, 78B' and conductor 78B" provide power for the right turn signal on the trailer; while wires 78C, 78C' and third conductor 78C" provide power for the left turn signal on the trailer. The wires 78D, 78D' and conductor 78D" provide power to the back-up lights on the trailer through male terminal 76.

For a three wire trailer light electrical system which does not have a back-up light circuit, fourth conductor 78D" is not used, and hence this conductor can be disconnected from the trailer. However, it is also important to maintain a proper ground between the trailer and the towing vehicle. Accordingly, male plug 81' on the second conductor portion 80' can be removed from female receptacle 81 on the first conductor portion 80. The second conductor portion 80' is then repositioned so that male plug 81' can be connected to a remote grounded receptacle 85 (see FIG. 2). The grounded receptacle 85 can comprise a ring terminal or other means which is electrically connected (e.g., bolted) to a ground on the towing vehicle. The male plug 81' can cooperatively mate with the grounded receptacle 85 to connect the second conductor portion 80' of the fourth conductor to ground, and hence ground the trailer to the towing vehicle. This grounded connection is provided through the wiring harness, tap plug and fourth conductor to the vehicle. An insulating sheath 86 can be provided over the open female receptacle 81 on first conductor portion 80 to prevent water or other damage to the female receptacle.

Alternately, according to a second embodiment of the invention as shown in FIG. 5, the fourth conductor 78D" can comprise a single conductor extending from tap plug 67 to a plug connection with the body of the T-shaped connector 63. In this embodiment, conductor 78D" includes male plug 81' on its selectively free end. The male plug 81' may be fittingly received in female receptacle 81 located in the body of the T-shaped connector. As described previously, plug 81' can be removed from female receptacle 81 when connecting the trailer light connection system to a trailer without backup lights. Fourth conductor 78D" is then repositioned so that male plug 81' can be inserted within grounded receptacle 85 to provide a grounded connection between the trailer and the towing vehicle. Additionally, an insulated plug (not shown) can be located in open female receptacle 81 to prevent damage to the receptacle.

It will be appreciated that the T-shape connector of the present invention can be readily interchanged between trailer lighting systems with or without backup lights. For example, to convert from a trailer without backup lights to a trailer with backup lights, the fourth conductor is merely reconnected between the tap plug 67 and the connector body 64, and the tap plug is then coupled to a complementary plug on the harness or trailer wiring system.

In either of the embodiments described above, the third terminal 67 is of an identical size and configuration for each T-shaped connector 63. Thus, even though the T-shaped connector may otherwise vary in size and/or terminal configuration for the first and second terminal means depending upon the vehicle manufacture and model year, the third terminal or trailer tap is identical for each and every T-shaped connector. Moreover, the third terminal can be used with both three and four wire trailer lighting systems. By standardizing the third terminal and all T-shaped connectors, a modular trailer light connection system is provided for pick-ups or other trucks. The standardized third terminal allows the number of stock keeping units required for trailer wiring harnesses to be reduced, while providing an easy to use system.

It will be apparent from the foregoing that changes may be made to the details of construction and configuration of the present invention without departing from the spirit of the invention as defined in the following claims.

What is claimed is:

1. A trailer light connection system selectively to provide electrical signals from a vehicle to a towed trailer, comprising:
a T-shaped connector having a body with three terminals, the first terminal being adapted for connection to a first vehicle wiring plug, the second terminal being adapted for connection to a second vehicle wiring plug to complete the vehicle wiring circuit, and the third terminal being electrically connected to the first and second terminals at least in part by four exposed insulated conductors, the third terminal constituting a tap plug adapted to provide electrical signals from the vehicle to the trailer lighting system, one of said exposed insulated conductors having a removable plug thereon which can be disconnected from the first and second terminals and coupled to a grounded connection on the vehicle to provide a grounded connection from the trailer through the tap plug to the vehicle.

2. A trailer light connection system as in claim 1, wherein the third terminal means forming the tap plug has three female terminal receptacles and a male terminal pin selectively cooperating in interfitting connections with three terminal pins and a terminal receptacle on a first harness plug of a trailer wiring harness, the other end of the trailer wiring harness being connected to the trailer lighting system to complete the electrical connection between the vehicle and trailer.

3. A trailer light connection system as in claim 1 wherein said one conductor has a first portion extending from said tap plug to a male plug and a second portion extending from said first and second terminals to a female receptacle, said male plug selectively interfitting with the female receptacle on the second portion, said male plug on said first portion also selectively interfitting with a female receptacle extending to the ground connection on the vehicle.

4. A trailer light connection system as in claim 1, wherein the third terminal means forming the tap plug has three female terminal receptacles and a male terminal pin selectively cooperating in interfitting connections with three terminal pins and a terminal receptacle on a trailer lighting system plug.

5. A trailer light connection system as in claim 1 wherein said one conductor leading from said tap plug has a male plug interfitting with a female receptacle on a body of said T-shaped connector, said male plug on said one conductor also selectively interfitting with a female receptacle extending to the ground connection on the vehicle.

6. A trailer light connection system selectively to provide electrical signals from a vehicle to a towed trailer, comprising:

a T-shaped connector having a body with three terminals, the first terminal being adapted for connection to a first vehicle wiring plug, the second terminal being adapted for connection to a second vehicle wiring plug to complete the vehicle wiring circuit, and the third terminal being connected by a plurality of conductors to the first and second terminals of the T-shaped connector, said conductors providing electrical signals from the vehicle to the trailer for the right and left turn signal lights, the brake light, and the back-up lights, the third terminal constituting a tap plug which is adapted to be coupled to the trailer lighting system, the conductor for the back-up light electrical signal having a connection with a removable plug which can be disconnected from the first and second terminals and coupled to a grounded connection on the vehicle to provide a grounded connection from the trailer through the tap plug to the vehicle.

7. A trailer light connection system as in claim 6, wherein said back-up signal conductor has a second portion extending from said tap plug to a male plug and a first portion extending from the first and second terminals to a female receptacle, the male plug selectively interfitting either with the female receptacle on the first portion or with another female receptacle extending to the ground connection on the vehicle.

8. A trailer light connector system as in claim 6, wherein said back-up signal conductor extends from said tap plug and has a male plug on its end, which selectively interfits either with a female receptacle for said first and second terminals or with a female receptacle extending to the ground connection on the vehicle.

* * * * *